United States Patent [19]

Simmons

[11] Patent Number: 4,694,535

[45] Date of Patent: Sep. 22, 1987

[54] POST STUNNER FOR POULTRY

[76] Inventor: Lacy Simmons, P.O. Box 546, Dallas, Ga. 30132

[21] Appl. No.: 869,322

[22] Filed: Jun. 2, 1986

[51] Int. Cl.$^4$ .......................... A22C 21/00; A22C 3/06
[52] U.S. Cl. .......................................... 17/1 E; 17/11
[58] Field of Search ..................................... 17/1 E, 11

[56] References Cited

U.S. PATENT DOCUMENTS 4,092,761  6/1978  McWhirter ........................... 17/1 E

FOREIGN PATENT DOCUMENTS

| 681084 | 3/1964 | Canada | 17/11 |
| 7903681 | 11/1980 | Netherlands | 17/1 E |
| 0586887 | 1/1978 | U.S.S.R. | 17/1 E |
| 0706043 | 12/1979 | U.S.S.R. | 17/1 E |

Primary Examiner—Willie G. Abercrombie
Attorney, Agent, or Firm—Eric P. Schellin

[57] ABSTRACT

A vertically adjustable ladder contactor for a post stunner has two fluidic piston and cylinders for raising and lowering the ladder contactor. Four parallel support rods suspended from the conveyor track are formed of an electrical insulator to prevent short circuit of the stunner. In addition, the piston and cylinder assemblies are similarly insulated. By extending or contracting the piston and cylinder assemblies, the ladder contactor can be raised or lowered parallel to the poultry transporting conveyor.

12 Claims, 4 Drawing Figures

POST STUNNER FOR POULTRY

BACKGROUND OF THE INVENTION

1. Field of the Invention

The invention is related to vertically adjustable stunners for electrically stunning poultry after the killing operation.

2. Description of the Prior Art

In modern poultry processing plants, the poultry is transported to various processing operations along a continuous conveyor in the form of a track. The poultry is suspended in shackles, by its feet, upside down. The poultry is transported along the track, and passed through a killing station wherein the jugular veins of the poultry is cut. The heart of each bird beat after the bird passes through the killing station, forcing blood from the bird through the now cut jugular vein.

Electric shocks have been used to immobilize the birds both before and after killing, as disclosed in U.S. Pat. Nos. 3,828,397, (pre-stunning), 2,335,993, and 3,474,490, (post stunning), and 2,306,773, (pre-stunning and post stunning). As disclosed in U.S. Pat. No. 2,335,993, a cross bar arrangement maybe used for shocking the birds. The cross bar arrangement is vertically adjustable and mounted to downwardly depending bars supported by the conveying track. Stunning devices have to be adjusted vertically to account for birds of different sizes, to insure for adequate electrical contact. Proposed vertical adjustment means disclosed in the above-identified patents include manually operated screw threaded jacking means, manually adjustable gear contacting racks, and manual positioning and frictional holding of the stunner.

SUMMARY

It is the object of the present invention to provide a post stunner which provides a series of electrical shocks to a killed and bleeding bird. By providing a series of electric shocks the muscles of the killed bird have a chance to contract and relax, contract and relax pumping blood from the bird. The removal of blood is very important in providing marketable poultry. Fast food chains especially, want the blood removed from poultry meat, so that chicken nuggets and similar products do not ooze undrained blood during eating, presenting an unappetizing appearance. In addition, completely draining the blood from the bird, satisfies Kosher dietary laws.

During the killing operation the jugular veins, vagus nerves and carotid arteries are cut. The vagas nerves are part of the sympathetic nerve system, and as such, cutting of the vagus nerves results in cessation of heart contractions. In the prior art, heart contractions were relied upon to bleed the bird through the cut jugular veins. With the present invention, many of the muscles of the bird are electrically pulsated, thereby better draining blood from the bird.

In that it is important that the bird receive a series of spaced electric shocks, the vertical location of the electrical contractor in relationship to the bird is critical. If the contactor is too close to the conveyor means, the bird will not receive a series of shocks and will remain in continuous contact with the contactor as it is dragged across and bridges the cross bars of the contactor. This results in incomplete draining because the bird's muscles do not have the opportunity to relax between contractions. Conversely, if the contactor is spaced too far from the conveyor means, the bird does not come into contact with the contactor, resulting in incomplete drainage of blood.

The present invention is directed to a stunner that can be automatically vertically positioned by fluidic cylinder and piston means. As such the present stunner assembly can be more readily adjusted to different line operating conditions and different sized birds.

An electrical circuit is set up between the electrically conductive track and a ladder contactor having a plurality of cross bars. A bird passing between the track and the contactor and contacting both would be electrically shocked. The ladder contactor is supported from the track by four parallel rods that are pivotally coupled between the contactor and the track, so that the contactor can be raised and lowered parallel to the track. The rods are arranged in two pairs with each pair having a rod on opposing sides of the contactor. The rods are formed from an electrical insulator to prevent short circuiting of the stunner.

A fluidic assembly is positioned between the contactor and the track to raise and lower the contactor into an optimal vertical position. The fluidic assembly comprises two parallel piston and cylinder assemblies arranged obliquely to the parallel support rods. The two piston and cylinder assemblies are pivotally coupled to the track adjacent to the first pair of support rods and are directly coupled to the second pair of support rods. A fluidic pressure source supplies pneumatic pressure to the piston and cylinder assemblies, retracting and extending the piston rods, thereby raising and lowering the contactor.

DETAILED DESCRIPTION

Figure 1:
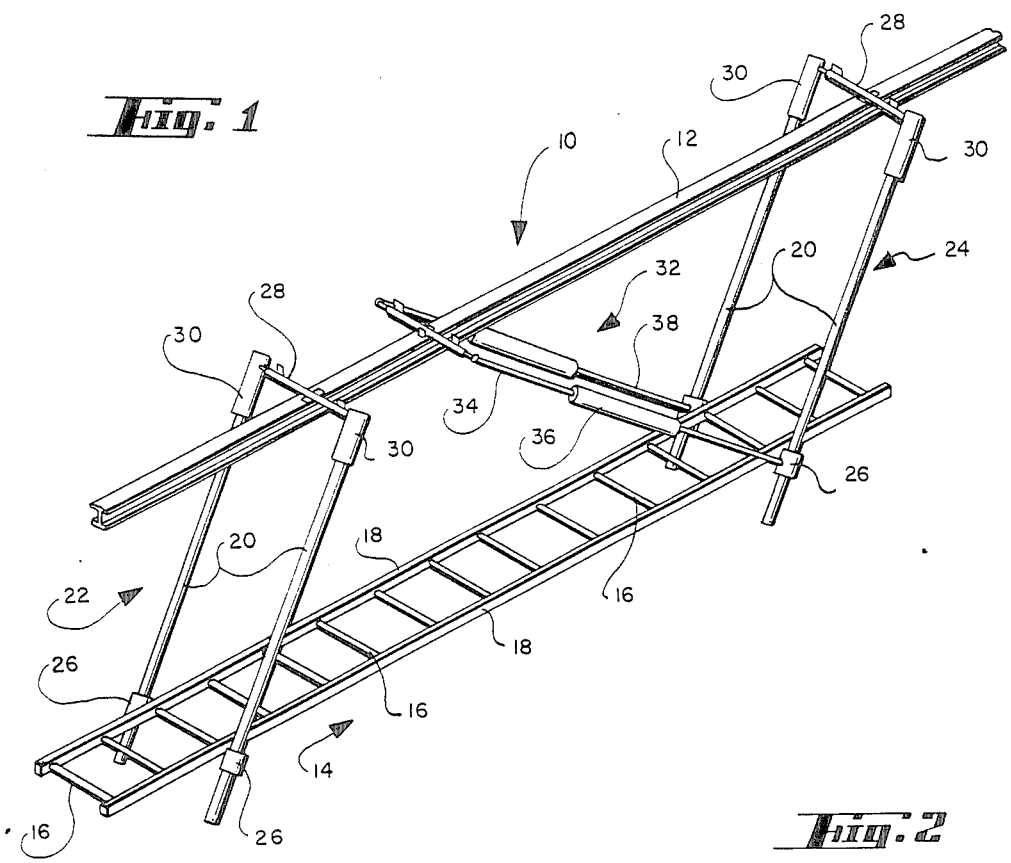
FIG. 1 is an perspective view of the invention.

FIG. 1 is a perspective view of the present invention, which is designated by reference numeral 10. Stunner 10 is pivotally coupled to a conventional horizontally disposed track 12, which is in the shaped of an I-beam. Track 12 is a portion of the conveyor means by which poultry are transported to the various processing steps. More specifically, shackles (not shown) for gripping a bird's feet, are coupled to the track so that the birds may be transported from one location to another in an equidistant manner. An endless chain or cable (not shown) is positioned under the I-beam and is coupled to the shackles, to provide the motive powder for transporting the birds.

Figure 2:
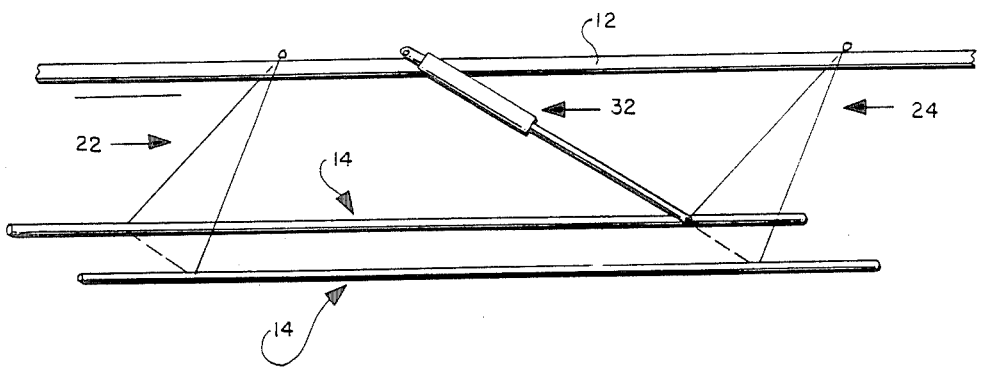
FIG. 2 is a schematic elevation view of the stunner, illustrating the various vertical positions.
Figure 3:
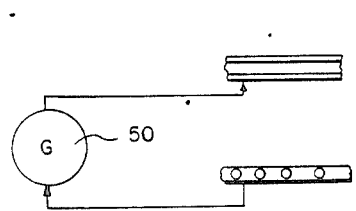
FIG. 3 is a schematic view of the electrical system.
Figure 4:
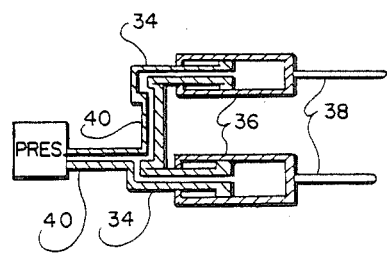
FIG. 4 is a schematic view of the fluidic system.

Ladder contactor 14 is positioned under the conveyor means and is formed from a plurality of cross bars 16 mounted on two parallel members 18. The contactor ladder is formed from an electrically conductive material. The contactor ladder is supported from track 12 by support rods 20. All four support rods are parallel to one another and are arranged in two pairs 22 and 24. As shown, each pair of rods have a rod on opposed sides of the contactor ladder. The rods are pivotally coupled to the contactor ladder by a pivot rod (not shown) that extends through one of the cross bars and is coupled to lower mounting sleeve 26. Another pivot rod is located in overhead sleeve 28 and is pivotally coupled to upper mounting sleeve 30. In that all the rods are parallel, and pivotally coupled to the track and the contactor ladder, the contactor ladder is free to be swung to various vertical positions, as schematically illustrated in FIG. 2.

Two fluidic piston and cylinder assemblies 32 are located between the support rod pairs and are used to raise and lower the contactor ladder. As is apparent from the drawings, the piston and cylinder assemblies are parallel to one another and are arranged at an oblique angle to the support rods. The piston and cylinder assemblies comprise hollow piston rods 34, cylinders 36 and cylinder extension rods 38. A pressurized source of fluid 40 is directed through tubing 42 into hollow piston rods 34, wherein it is directed into the cylinders forcing the cylinder extension rods downward, extending the piston and cylinder assembly, lowering the contactor ladder. The pressurized source of fluid may either be pneumatic or hydraulic depending upon specific design conditions.

Piston rod 34 and cylinder extension rod 38 are pivotally coupled to the track and to the contactor ladder. Similarly to the support rods, piston rod 34 is coupled to the a pivot rod (not shown) that is located in overhead sleeve 42 that is mounted to track 12. Cylinder extension rod 38 is journalled so that the pivot rod extending through the cross bar for support rod pair 24 will also support the cylinder extension.

Similarly to the support rods, the piston and cylinder assemblies must be electrically insulated to prevent short circuiting of the stunner. It is preferred that the piston rod or cylinder and cylinder extension be made of an electrical insulator.

As would be readily apparent to a person having ordinary skill in the art, a bird is transported from a killing station directly to the described stunner, where its depending head contacts the contact ladder. In that both the contacting ladder and track of the conveyor are electrified by electrical source 50, the depending bird provides an electrical path between the two causing an electric shock, immobilizing the bird.

In order to insure the safety of workers, and prevent electrocution, the electrical source produces a fifty volt AC output. However smaller voltages could also be used.

The fluidic means, of the presently described stunner, provides an efficient and relatively simple means for rapidly changing the vertical position of the contactor ladder to accomodate different sized birds.

The above-described invention should not be limited by the disclosed embodiment, but should be limited solely by the claims that follow.

I claim:

1. A post stunner for delivering a plurality of electric shocks to poultry, after the poultry has passed through a killer station wherein the throat of the poultry is cut for bleeding the poultry comprising:

an electrically conductive conveyor means to which poultry can be secured and along which poultry is conveyed to various processing stations;

a plurality of electrically spaced conductive cross bars arranged perpendicular to the direction of the conveyor means defining a contactor ladder configuration positioned parallely beneath and adjustably supported by the conductive conveyor means, the contactor ladder is positioned to come into contact with poultry being transported by the electrically conductive conveyor means;

a source of about fifty volts alternating electric energy which is connected to the electrically conductive conveyor means and the contactor ladder; and a vertical positioning means for raising and lowering the contactor ladder so that it can be adjusted for different sized poultry being transported along the electrically conductive conveyor means, whereby the vertical positioning means is actuated to change the relative vertical position of the contactor ladder so that poultry being transported along the conveyor means come into successive contact with each of the cross bars of the contactor ladder completing an electric circuit between each said cross bar and the conveyor means, thereby providing the poultry with a plurality of spaced electric shocks, immobilizing the poultry and promoting increased blood flow.

2. A post stunner as defined by claim 1 wherein the ladder contactor is supported from the conveyor means by at least four parallel support rods each being electrically insulated.

3. A post stunner as defined by claim 2 wherein the support rods are pivotally coupled to the contactor ladder and the electrically conductive conveyor means.

4. A post stunner as defined by claim 2 wherein each support rod is pivottally coupled to the conveyor means and the ladder contactor.

5. A post stunner as defined by claim 4 wherein the vertical positioning means comprises a cylinder and piston means for raising and lowering the contactor ladder, that can be extended and retracted by a source of fluid pressure.

6. A post stunner as defined by claim 5 wherein the cylinder and piston means comprises two cylinder and piston assemblies that are arranged between the contactor ladder and the conveyor means, and do not provide a conductive path between the conveyor means and the ladder.

7. A post stunner as defined by claim 6 wherein the two cylinder and piston assemblies are parallel, arranged on opposite sides of the conveyor means and the ladder.

8. A post stunner as defined by claim 7 wherein the two cylinder and piston assemblies are arranged between the two pairs of rods, and at one end are coupled to the conveyor means, and at the other end are coupled to a point adjacent to the location where the second pair of rods are coupled to the contactor ladder.

9. A post stunner as defined by claim 8 wherein the two cylinder and piston assemblies are pivotally coupled to the conveyor means adjacent to the first pair of rods.

10. A post stunner as defined by claim 9 wherein the source of fluid pressure is pneumatic.

11. A post stunner as defined by claim 9 wherein the source of fluid pressure is hydraulic.

12. A post stunner as defined by claim 9 wherein the conveyor means is provided with external sleeves in which pivot rods are positioned for pivotally coupling the support rods and the piston and cylinder assemblies to the conveyor means.

* * * * *